(12) United States Patent
Abdelfattah (10) Patent No.: US 11,945,536 B2
(45) Date of Patent: Apr. 2, 2024

(54) TRANSFORMABLE BICYCLE OR TRICYCLE

(71) Applicant: Mohamed Abdelfattah, Revere, MA (US)

(72) Inventor: Mohamed Abdelfattah, Revere, MA (US)

(*) Notice: Subject to any disclaimer, the term of this patent is extended or adjusted under 35 U.S.C. 154(b) by 176 days.

(21) Appl. No.: 17/524,124

(22) Filed: Nov. 11, 2021

(65) Prior Publication Data

US 2022/0144372 A1 May 12, 2022

Related U.S. Application Data

(60) Provisional application No. 63/163,795, filed on Mar. 20, 2021, provisional application No. 63/112,377, filed on Nov. 11, 2020.

(51) Int. Cl.
*B62K 15/00* (2006.01)
*B62J 1/00* (2006.01)
*B62K 5/06* (2006.01)
*B62M 3/08* (2006.01)

(52) U.S. Cl.
CPC ............... *B62K 15/006* (2013.01); *B62J 1/00* (2013.01); *B62K 5/06* (2013.01); *B62M 3/08* (2013.01)

(58) Field of Classification Search
CPC ............. B62K 5/06; B62K 15/006; B62J 1/00
See application file for complete search history.

(56) References Cited

U.S. PATENT DOCUMENTS

| | | | |
|---|---|---|---|
| 2,498,663 A * | 2/1950 | Easley | B62J 7/04 224/450 |
| 3,592,487 A * | 7/1971 | Mansperger | B62J 15/02 280/282 |
| 3,873,127 A * | 3/1975 | McNichol, Jr. | B62J 1/28 297/215.12 |
| 4,159,752 A * | 7/1979 | Kanno | B62K 5/025 280/282 |
| 4,367,829 A * | 1/1983 | Kusz | B62J 7/04 297/215.11 |
| 4,966,381 A * | 10/1990 | Feikema | B62K 5/06 280/87.051 |
| 5,285,935 A * | 2/1994 | Hsueh | B62J 1/16 224/450 |
| 5,423,462 A * | 6/1995 | Dickhaus | B62J 1/16 224/415 |
| 5,941,548 A * | 8/1999 | Owsen | B62K 5/10 280/282 |

(Continued)

FOREIGN PATENT DOCUMENTS

CN 105197157 B * 2/2018
CN 108001595 A * 5/2018

*Primary Examiner* — Tony H Winner
*Assistant Examiner* — Hosam Shabara
(74) *Attorney, Agent, or Firm* — Witters & Associates; Steve Witters (57) ABSTRACT

A transformable bicycle or tricycle is presently provided. The transformable bicycle has a first seat and a second seat disposed rearward or forward of the first seat. At least one of the first seat and the second seat is transformable and has a planar seat and a planar back. The transformable seat is configured and disposed to transform into an enclosure or into a flat planar bench having the planar seat and the planar back substantially in the same plane.

14 Claims, 8 Drawing Sheets

(56) References Cited

U.S. PATENT DOCUMENTS

| 7,249,779 | B2 * | 7/2007 | Ehrenreich | ............... | B62B 7/12 |
| | | | | | 280/643 |
| 2020/0239099 | A1 * | 7/2020 | Lu | ........................ | B62K 15/006 |
| 2020/0339214 | A1 * | 10/2020 | Duong | ..................... | B62K 5/06 |
| 2021/0229770 | A1 * | 7/2021 | Schultz | ...................... | B62J 1/28 |

* cited by examiner

TRANSFORMABLE BICYCLE OR TRICYCLE

CROSS-REFERENCE TO RELATED APPLICATIONS

This application claims the benefit of U.S. Application No. 63/112,377, filed Nov. 11, 2020, entitled "A Transformable Bicycle or Tricycle", and U.S. Application No. 63/163, 795, filed Mar. 20, 2021, entitled "Foldable or Extendable Tricycle", both of which are hereby incorporated by reference in their entirety.

FIELD OF THE DISCLOSURE

This invention generally relates to transformable bicycles or tricycles, more specifically toward a bicycle or tricycle having a transformable seat configured and disposed to transform into an enclosure or into a flat planar bench having a planar seat portion and a planar back portion configured to become disposed in substantially in the same plane.

BACKGROUND

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

Bicycles and tricycles come in many configurations and may have one or two seats. For example, tandem bicycles typically have a front seat and a back seat. Many accessories are available for bicycles and tricycles. For example, trailers, carriers, racks, trunks, bags, child seats, and a variety of other accessories are available for bicycles and tricycles.

It may be desirous for a bicycle or tricycle to be transformable to enable it to have added functionality when desired.

SUMMARY

In at least one aspect of the present disclosure, a transformable bicycle or tricycle is provided. The transformable bicycle or trickle has a steerable front wheel and at least one rear wheel. A frame operable holds the steerable front wheel and the at least one rear wheel. At least two pedals are configured and disposed to rotate at least one rear wheel and move the bicycle or tricycle, upon rotating the pedals. The bicycle or tricycle has a first seat and a second seat disposed rearward or forward of the first seat. At least one of the first seat and the second seat is transformable and has a planar seat and a planar back. The transformable seat is configured and disposed to transform into an enclosure or into a flat planar bench having the planar seat and the planar back substantially in the same plane.

In at least one other aspect of the present disclosure, a transformable tricycle is provided. The transformable tricycle has a steerable front wheel and two rear wheels. A frame extends between an axle supporting the rear wheels and a fork holding the steerable front wheel. At least two pedals are configured and disposed to rotate at least one of the rear wheels and move the bicycle or tricycle, upon rotating the pedals. The transformable tricycle has a first transformable seat and a second seat disposed rearward or forward of the first seat. The first transformable seat has a planar seat portion rotatingly or hingedly held to an edge of a planar back portion. The first seat is configured and disposed to transform into the flat planar bench having the planar seat portion and the planar back portion disposed substantially in the same plane.

In at least one further aspect of the present disclosure, a transformable bicycle or tricycle is provided. The transformable bicycle or tricycle has a steerable front wheel and at least one rear wheel. A frame extends between a rear axle supporting the at least one rear wheel and a fork holding the steerable front wheel. At least two pedals are configured and disposed to rotate the at least one rear wheel and move the bicycle or tricycle, upon rotating the pedals. The transformable bicycle or tricycle has a first seat and a second seat disposed rearward of the first seat. The second seat has a planar seat and a planar back and is configured and disposed to transform into an enclosure.

BRIEF DESCRIPTIONS OF THE DRAWINGS

The following figures, which are idealized, are not to scale and are intended to be merely illustrative of aspects of the present disclosure and non-limiting. In the drawings, like elements are depicted by like reference numerals. The drawings are briefly described as follows.

DETAILED DESCRIPTION

In at least one embodiment of the present disclosure, a transformable or extendable tricycle is provided. The extendable tricycle has a front wheel and two back wheels. An axle may extend between the two back wheels or each back wheel may have its own axle. At least one extendable frame bar is configured and disposed to operable hold the rear wheels and the front wheel. For example, the transformable tricycle may have one or more lower extendable frame bars and/or one or more upper extendable frame bars configured and disposed to operable hold the rear axle(s) or rear wheels, and the front wheel. The transformable tricycle may have an extendable pedal bar and the extendable pedal bar may extend between a rear set of pedals and a front set of pedals.

The transformable tricycle has an extending mechanism configured and disposed to extend a length of the extendable or transformable tricycle, or a distance between the front wheel and the back wheels, from a lesser length and to a greater length, and retracted back to the lesser length. Upon the extendable tricycle being extended to the greater length, the extendable tricycle has at least one extendable frame bar in an extended orientation and operable holding the rear wheels and the front wheel. For example, the transformable tricycle may have one or more lower extending frame bars, one or more upper extending frame bars, and an extendable pedal bar in an extended configuration.

In at least another embodiment, the presently disclosed extendable tricycle has a transformable seat. The transformable seat has a back portion hingedly attached to a seat portion. The extendable tricycle may have a rear seat which also may have a back portion hingedly attached to a seat portion. The transformable seat may be configured and disposed to form a substantially planar bench with the back portions and the seat portions of the front and rear seats in substantially the same plane, upon the extendable tricycle being extended to the greater or longer length. One of the seats may be configured and disposed to be moved toward the rear of the extendable tricycle, upon the extendable tricycle being retracted to a lesser length. For example, the frame is extendable and retractable and a first seat may be configured to move rearward and forward of a second seat, upon the first seat having its planar seat and planar back disposed in substantially the same plane and the frame being retracted and extended.

The presently disclosed transformable or extendable tricycle, or foldable trike, may be used for exercise, traveling, transporting people and or products. Seats may be designed as comfortable slim sport seats that may fold into a saddle ride position and or bench seats. The back seat may be widened to fit two children or two slim adults or one big person may fit comfortably. The back seat may be wider and may fold to a saddle ride position, and the back portion of the rear seat may fold flat as a bench. Seats and other adjustable or moving parts may be designed to be secured using a ratchet hinges. The front seat and/or back seat may form a flat surface that may allow a person to lie down straight like on an exercise bench. The front seat may fold under and behind the back seat when the trike is folded or shortened.

The transformable tricycle may be foldable or extendable having one or more of: (1) a front frame pressing on the front wheel and secured on a front post, wherein the front frame carries the front seat; (2) a back frame pressing on the two back wheels secured on a back axle, wherein the back frame carries the back seat; (3) a power screw or lead screw that rotates or spines on the back frame to retract or extend the front frame; (4) a nut attached to the front frame and connected to the power screw, when the power screw is configured to rotate in the back frame and the nut is configured and disposed to move forward or backward which may act as an arm that pushes or pulls the front frame to extend and to retract or fold the tricycle; (5) a peddling system with two foot pedal bars that extend and retract with the tricycle; (6) two foot pedals attached to each of the pedal bars, one proximate the front of the pedal bars and the other proximate the back of the pedal bars; (7) two arms pedals connected to the pedal bars to allow back riders to power the trike using arms; (8) the two pedal bars parallel to each other and configured to move back and forth in opposite directions from each other to the front and the back of the tricycle; and (9) the transformable tricycle being configured to have a driver sit in the front holding a handle bar for steering and pushing the pedal bars using leg while the back riders pushes the pedal bars while sitting and pushing or pulling arm pedals while sitting or standing.

The presently disclosed extendable tricycle, or foldable trike, may be configured for combining cycling and electrification while harnessing and uniting solar, wind and human-power in one machine. An objective may be to provide the comfort and security of an electric vehicle while giving the option to move and perform physical exercise whether the vehicle is moving or standing still. The transformable tricycle may have one or more of the following characteristics: (1) three wheels, two back wheels and a shorter, wider front wheel; (2) a foldable or extendable frame, wherein the tricycle is completely functional while shortened or lengthened; (3) foldable seats, front and back seat, configured fold to a flat bench or saddle seat; (4) head shield and/or body shield to secure riders; (5) paddling, or pedaling, system which may allow for up to three pedalers, or two pedalers and a paddler, to exercise at the same time, with the back riders exercising using their hands and/or and legs. (6) locking and towing capabilities to tow another trike or attachments and to secure it in a charging station or while transported on another vehicle; (7) a front wheel hub, an internal battery, a second removable and/or replaceable battery which may be secured to the front frame post to enable replacing the battery and allow traveling long distance without the need to stop for long time to charge; (8) a lighting system, head, tail, breaks and turn signals and a horn connected to a 12V battery and dynamo hub; (9) an aerodynamic body design to reduce drag; (10) floating capabilities; (11) trike outer body "doors and or sealing" which may act as a shield to protect and shelter the rider(s) which may be configured to fold or to act as a sail and/or solar charger to harness and use wind and solar power; (12) a dynamo or alternator hub configured to charge a battery and store human power, braking, and downhill power. Spring may be used to harness gravity or downhill power; (13) the tricycle of the present disclosure may be functional or operable at any point between the two lengths "a" and "b", or a greater length and a lesser length; (14) pedalers may use the pedal bars while sitting with their back supported, or sitting in a saddle ride position, or they may use the pedal bars while standing; (15) a locking system or towing capabilities, where the tricycle may be locked or connected to be pulled or pushed using a second tricycle; and (16) the locking system may also be configured to secure the tricycle to a base or dock when standing or parked.

Reference will now be made in detail to the present exemplary embodiments and aspects of the present invention, examples of which are illustrated in the accompanying figures. The same reference numbers may be used in the figures to refer to the same or like parts. The presently disclosed embodiments, aspects, and features of the present invention are not to limit the presently claimed invention as other and different embodiments, aspects, and features will become apparent to one skilled in the art upon reading the present disclosure.

Figure 1:
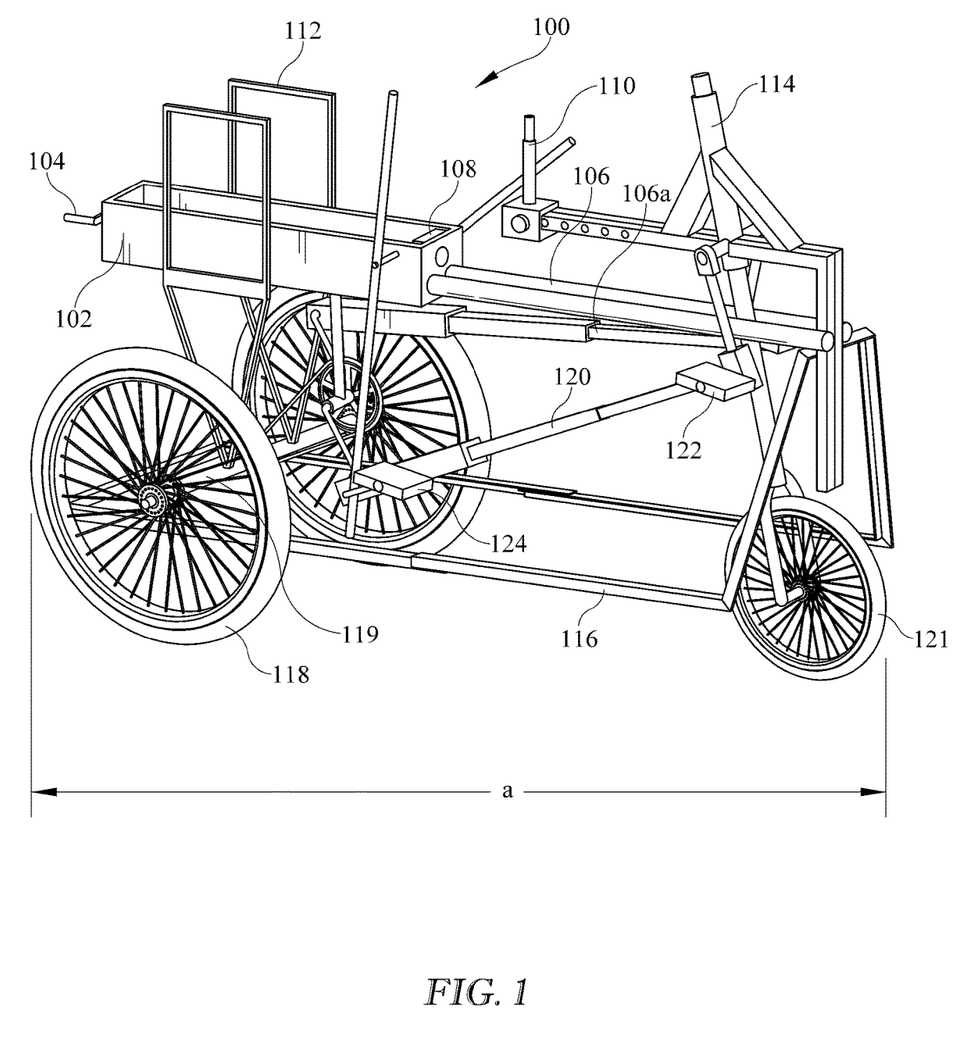
FIG. 1 is a perspective view of the foldable or extendable tricycle of the present disclosure being extended into a greater or longer length.

FIG. 1 shows a perspective view of a transformable, foldable, or extendable tricycle 100 of the present disclosure in an extended orientation. Tricycle 100 is shown transformed into an extended, a longer, or a greater length and is configured to be retracted to a shorter or lesser length. Extendable tricycle 100 comprises a front wheel 121, two back wheels 118, and an axle 119 extending between two back wheels 118, and at least one extendable frame bar 106, 106a, and 116. For example, transformable tricycle 100 may have a pair of lower extendable frame bars 116, at least one upper extendable frame bar 106 and/or 106a. The frame bars are configured and disposed to operable hold rear wheels 118 and steerable front wheel 121.

Extendable pedal bar 120 extends between a rear set of pedals 124 and a front set of pedals 122. An extending mechanism 102 is configured and disposed to extend a length of extendable tricycle 100, or a distance between front wheel 121 and back wheels 118, from a lesser length "b" to a greater length "a", and back to lesser length "b". The extending and folding or retracting of extendable tricycle 100 may be performed by turning crank 104 or by activating motor 104a.

In at least one embodiment, upon extendable tricycle 100 being extended to the greater "a", extendable tricycle 100 has the pair of lower extending frame bars 116, the at least one upper extending frame bar 106, and the extendable pedal bars 120 in an extended configuration, as shown in FIG. 1.

Extendable tricycle 100 may have a forward seat support 110 configured and disposed to support a seat or portion thereof. Forward seat support 110 may be adjustable. For example, forward seat support 110 may be configured and disposed to be moved forward or rearward, upon extending and retracting extendable tricycle 100. Extendable tricycle 100 may have a rearward seat support 112 configured and disposed to support a seat or portion thereof. Steering stem 114 may extend upward from a frontal portion of tricycle 100 for the attachment of handle bars or steering wheel.

Figure 2:
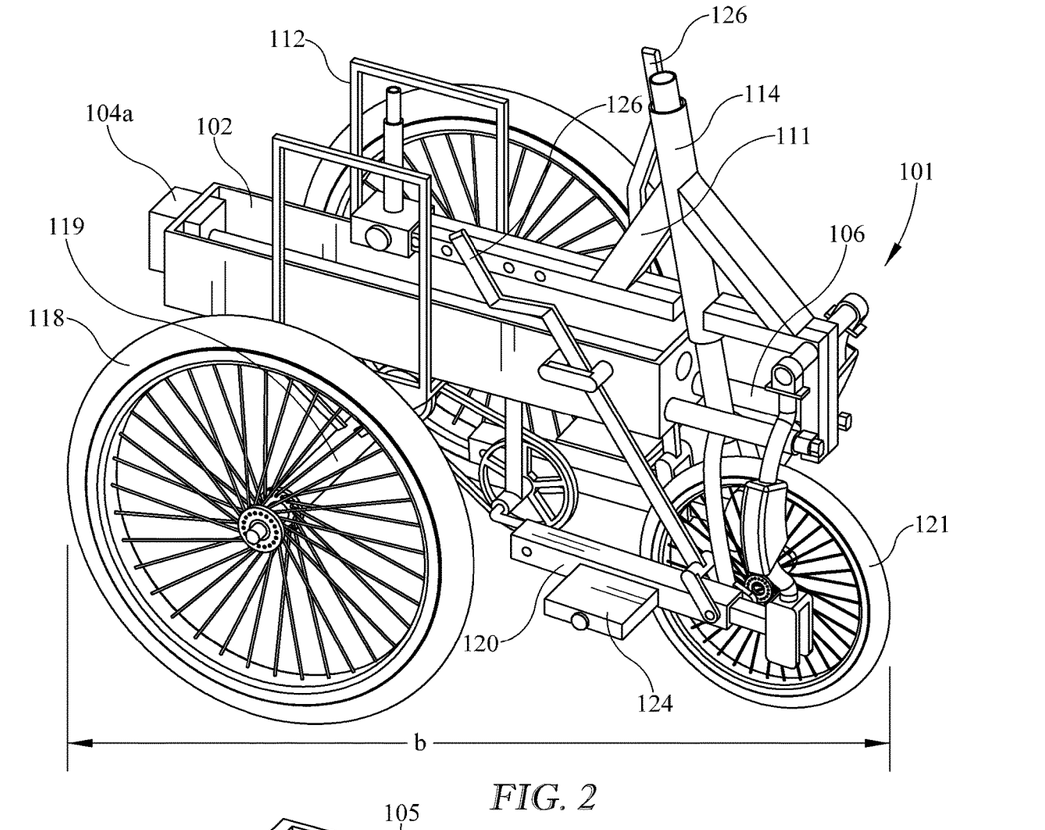
FIG. 2 is a perspective view of the foldable or extendable tricycle of the present disclosure being retracted into a lesser length.

FIG. 2 shows a perspective view of a transformable, foldable, or extendable tricycle 101 of the present disclosure in a retracted orientation. Tricycle 101 is shown transformed into retracted, shorter, or a lesser length "b" and is configured to be extended to a greater length, such as length "a". Extendable tricycle 101 comprises a front wheel 121, two back wheels 118, and an axle 119 extending between two back wheels 118, and at least one extendable frame bar 106. For example, transformable tricycle 101 may have a pair of lower extendable frame bars 106. The frame bars are configured and disposed to operable hold rear wheels 118 and steerable front wheel 121.

Extendable pedal bar 120 operable holds pedals 124. Extenting mechanism 102 is configured and disposed to extend a length of extendable tricycle 101, or a distance between front wheel 121 and back wheels 118, from lesser length "b" to a greater length, such as length "a", and back to lesser length "b". The extending and folding or retracting of extendable tricycle 101 may be performed by turning crank 104 or activating motor 104a. Transformable tricycle 101 may have one or more pairs of paddle bars 126. Paddle bars 126 may be configured and disposed to enable a rider to move tricycle 101 by pushing and/or pulling paddle bars 126. For example, one or two paddle bars 126 may be in communication with a pedal bar 120 and may be configured to enable a front and/or rear seat rider to power transformable tricycle 101 by hand.

Upon extendable tricycle 101 being retracted to lesser length "b", extendable tricycle 101 has at least one frame bar 106 and the extendable pedal bars 120 in retracted configuration, as shown in FIG. 2. Extendable tricycle 101 may have a forward seat mounting area 111 configured and disposed to support a seat or portion thereof. A seat may be mounted to the frame, proximate forward seat mounting area 111 and the forward seat may be configured and disposed to be moved forward or rearward, upon extending and retracting extendable tricycle 101. Extendable tricycle 101 may have a rearward seat support 112 configured and disposed to support a seat or portion thereof. Steering stem 114 may extend upward from a frontal portion of tricycle 101 for the attachment of handle bars or steering wheel.

Figure 3:
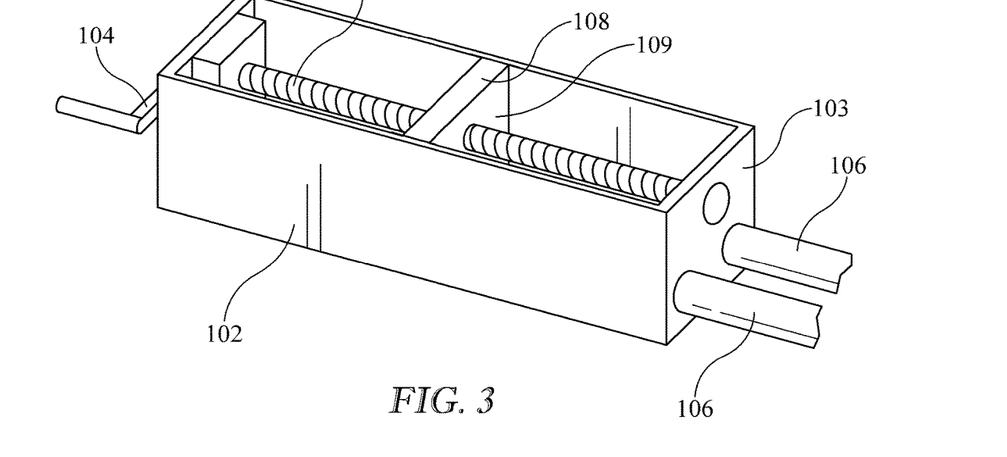
FIG. 3 is an illustrative view of an extending mechanism configured and disposed to extend, and retract, the foldable or extendable tricycle of the present disclosure between the lesser and greater lengths.

FIG. 3 shows an illustrative view of extending mechanism 102 configured and disposed to extend, and retract, the transformable tricycle of the present disclosure. For example, extending mechanism 102 may be configured to transform the tricycle between the lesser length "b" and the greater length "a". In at least one embodiment, extending mechanism 102 may have two upper extendable frame bars 106. Upper extendable frame bars 106 may extend from, and be attached to, plate 108 and through apertures in housing 103. For example, upper extendable frame bars 106 may be welded to plate 108. Plate 108 may have a threaded aperture 109 configured and disposed to threadingly engage with longitudinal screw 105. Crank 104, or motor 104a, may be configured to rotate longitudinal screw 105 and move plate 108, forward and reward in housing 103. The forward and rearward movement of plate 108 extends and contracts upper extendable frame bars 106 with respect to housing 103. Therefore, the rotation of crank 104 in a first direction retracts foldable or extendable tricycle 100 or 101 to lesser length "b" and the rotation of crank 104 in a second direction extends foldable or extendable tricycle 100 or 101 to greater length "a". It is to be understood, that the transformable tricycle of the present disclosure may be configured to be extended and retracted with electrical power, such as with electric motor 104a.

Figure 4:
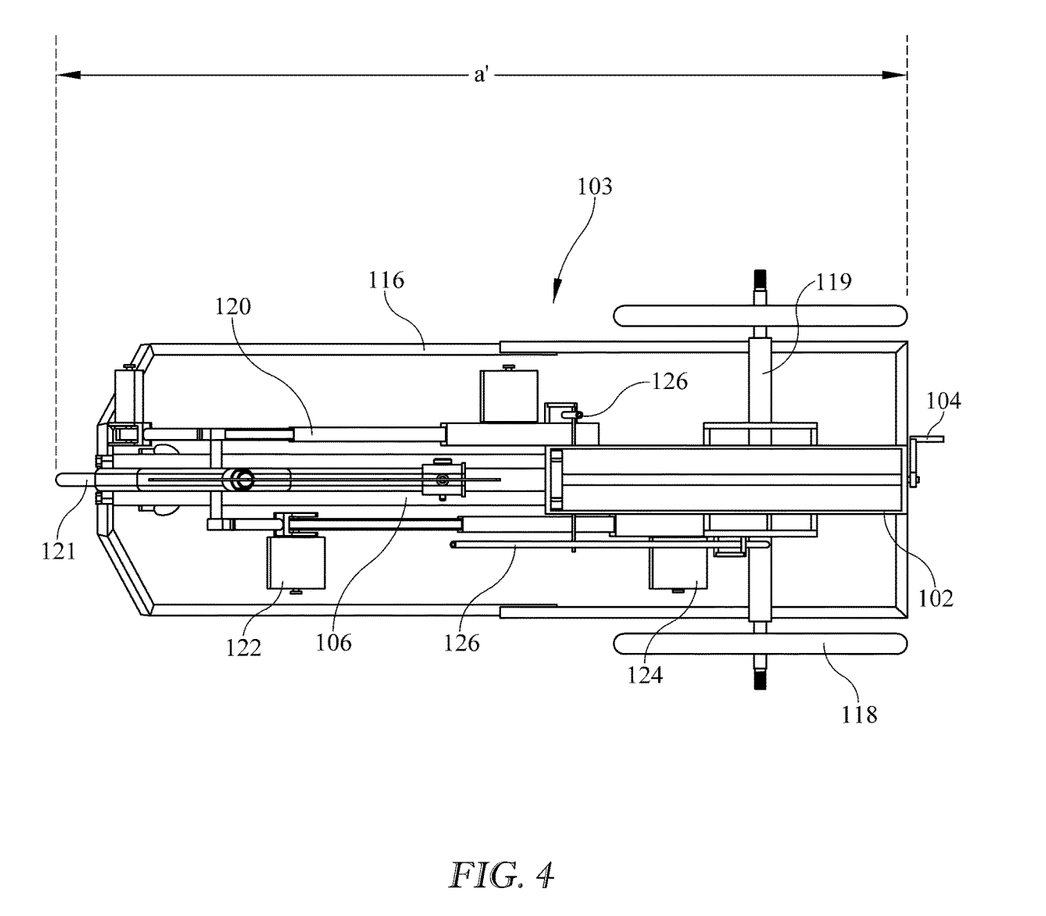
FIG. 4 shows an illustrative top view of the foldable or extendable tricycle of the present disclosure in an extended orientation.

FIG. 4 shows an illustrative top view of a transformable, foldable, or extendable tricycle 103 of the present disclosure in an extended orientation. Tricycle 103 is shown transformed into an extended, a longer, or a greater length and is configured to be retracted to a shorter or lesser length. Extendable tricycle 103 comprises a front wheel 121, two back wheels 118, and an axle 119 extending between two back wheels 118, and at least one extendable frame bar 106. For example, transformable tricycle 103 may have a pair of extendable frame bars 106. Frame bars 106 are configured and disposed to operable hold or support rear wheels 118 and steerable front wheel 121.

Extendable pedal bars 120 extend between a rear set of pedals 124 and a front set of pedals 122. An extending mechanism 102 is configured and disposed to extend a length of extendable tricycle 103, or a distance between front wheel 121 and back wheels 118, from a lesser length and to a greater length a', and back to the lesser length. The extending and folding or retracting of extendable tricycle 103 may be performed by turning crank 104. In at least one embodiment, upon extendable tricycle 103 being extended to the greater a', extendable tricycle 103 has the pair of lower extending frame bars 116, the at least one upper extending frame bar 106, and the extendable pedal bars 120 in an extended configuration, as shown in FIG. 4.

Extendable tricycle 103 may have a forward seat support configured and disposed to support a seat or portion thereof. Extendable tricycle 103 may have a rearward seat support configured and disposed to support a seat or portion thereof.

Frame bars 106 may act as a frontal frame portion and may be connected to, or in communication with, the steering post 114. Frame bars 106 may hold extending mechanism 102. Extending mechanism 102 may have a housing which may function a rear frame portion that holds the back or rear seat and may be supported or secured on the rear axle. For example, the rear wheels and the rear axle may hold the extending mechanism. Frame bars 106 may also hold the extending mechanism 102. When extending mechanism 102 is activated, by turning crank 104 or engaging an electric motor, longitudinal screw 105 pulls extendable bars 106 into extending mechanism 102 or its housing. The extendable bars 106 may be supported on the front wheel, fork, and the steering post, while the extending mechanism 102 may be supported on the back wheels or rear axle. The extending mechanism 102, or the rear frame portion, holds or carries the rear seats and the extending frame bars may hold the front first seat.

Figure 5A:
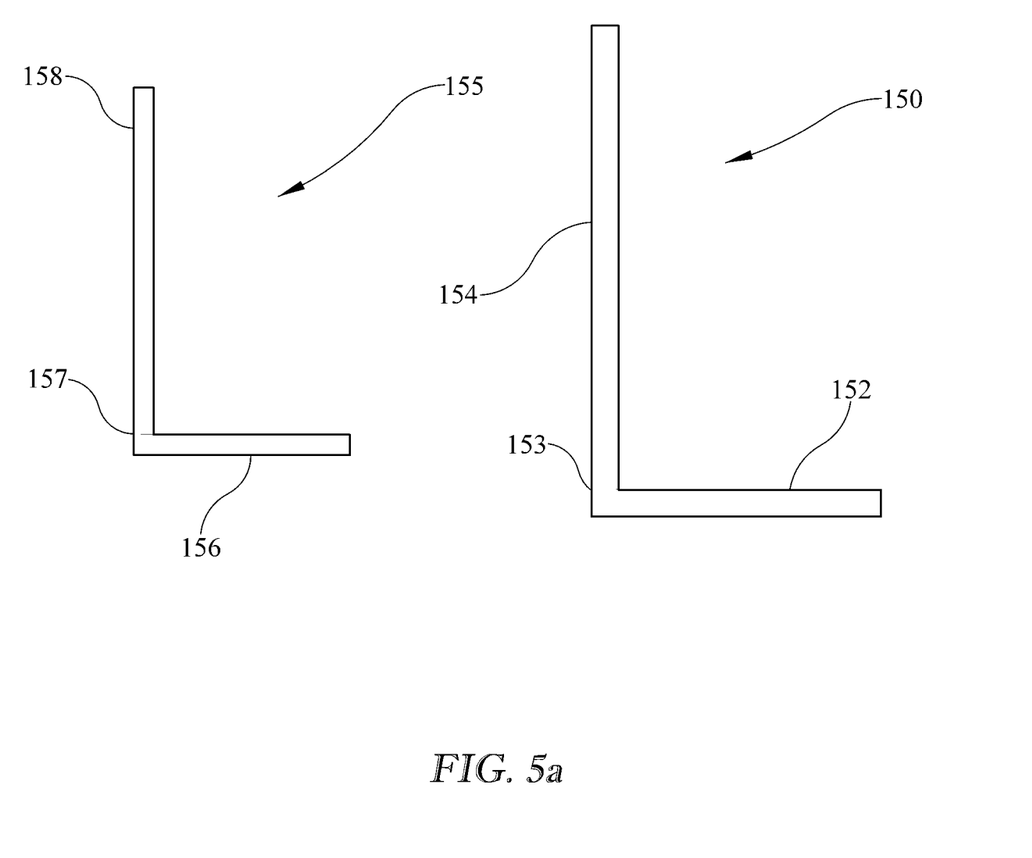
FIG. 5a is a perspective view of a seat adapted for the foldable or extendable tricycle of the present disclosure.
Figure 5B:
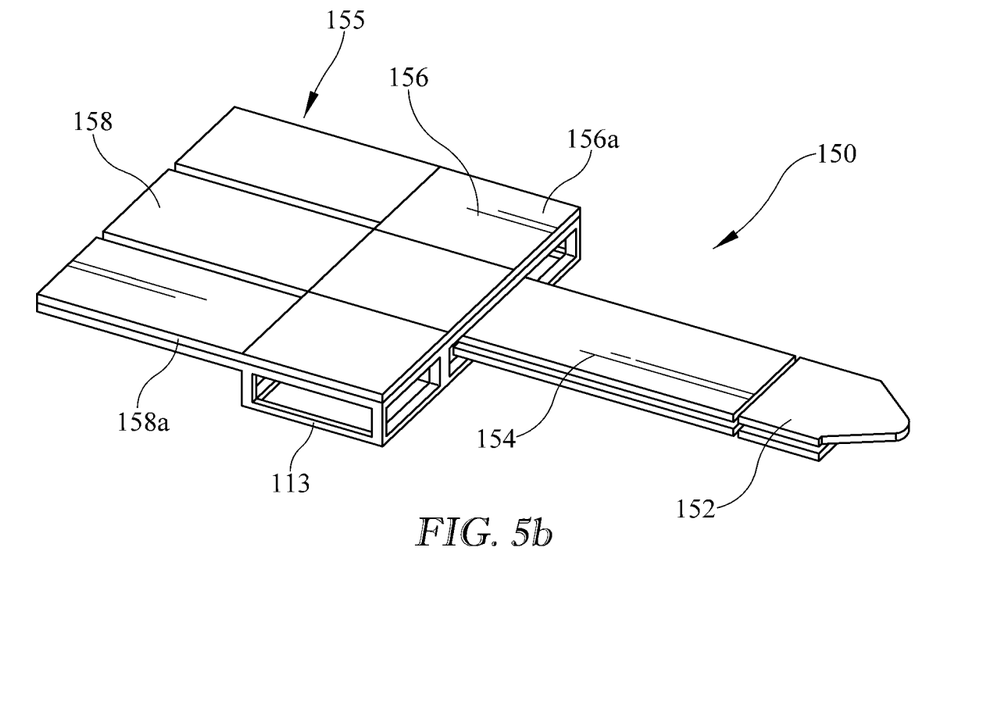
FIG. 5b is a perspective view of a seat adapted for the foldable or extendable tricycle of the present disclosure, the seat being in a planar bench configuration.
Figure 5C:
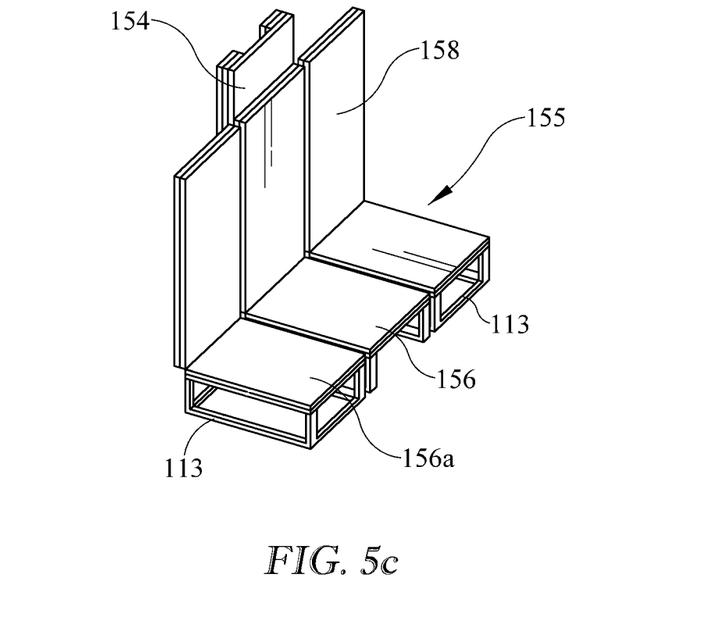
FIG. 5c is a perspective view of a seat adapted for the foldable or extendable tricycle of the present disclosure, the seats being in a configuration for the retraction of the frame.

FIGS. 5a, 5b, and 5c are views of seats that may be adapted for the foldable or extendable tricycle of the present disclosure. For example, FIG. 5a shows a side view of a forward or first seat 150 and a second or reward seat 155. Transformable seat 150 may have a back portion 154 hingedly attached to a seat portion 152. Seat portion 152 may be held and supported on extendable tricycle 100, 101, or 103 with a forward seat support, such as forward seat support 110. A rear, or second, seat 155 has a back portion 158 hingedly attached to a seat portion 156.

Transformable seats 150 and/or 155 may be configured and disposed to form a substantially planar bench. For example, transformable seat 150 may be configured for rotating planar back 154 about a hinge 153 and moving back portion 154 into substantially the same plane as planar seat portion 152. Likewise, transformable second seat 155 may be configured for rotating planar back 158 about a hinge 157 and moving back portion 158 into substantially the same plane as planar seat portion 156.

FIG. 5b a perspective view of seats 155 and 155 being disposed in a planar bench configuration. For example, back portions 154 and 158 and seat portions 152 and 156 of first seat 150 and second seat 155 are disposed in substantially the same plane. The presently disclosed transformable tricycle may be disposed in this configuration the transformable tricycle being extended to the greater length, such as length "a". Second seat 155 may have a seat support 113 which may be adapted to fit with rear seat support 112 or a rear portion of the frame.

Upon back portions 154 and 158 and seat portions 152 and 156 being disposed in substantially the same plane, first seat 150 may be configured to be moved rearward of second seat 155. For example, rear seat support 112 and/or 113 may have an opening for moving first seat 150 under second seat 155, upon the transformable tricycle being retracted. Additionally, first seat 150 or second seat 155 may be configured to be moved out of the common plane for moving first seat under second seat 155. Upon moving first seat 150 behind first seat 150, seat backs 158 and 154 may be disposed in an upright orientation, as shown in FIG. 5c.

In at least one embodiment, the presently disclosed transformable tricycle has a transformable seat 150. Transformable seat 150 may have a back portion 154 hingedly attached to a seat portion 152. Seat portion 152 may be held and supported on the transformable tricycle, such as with forward seat support 110. Seat 150 may be configured to be moved toward the rear of the transformable tricycle, upon the transformable tricycle being retracted to a lesser length, such as length "b".

The presently disclosed transformable tricycle may have a transformable second seat 155 with a planar seat portion 156 with an edge rotatingly or hingedly held to an edge of planar back portion 158 and be configured and disposed to transform into the flat planar bench having its planar seat and its planar back disposed substantially in the same plane. Second seat 155 may have a planar seat extending portion 156a with an edge rotatingly or hingedly held to opposite edges of planar seat 156 and a planar back extending portion 158a with an edge rotatingly or hingedly held to opposite edges of planar back 158.

Figure 6:
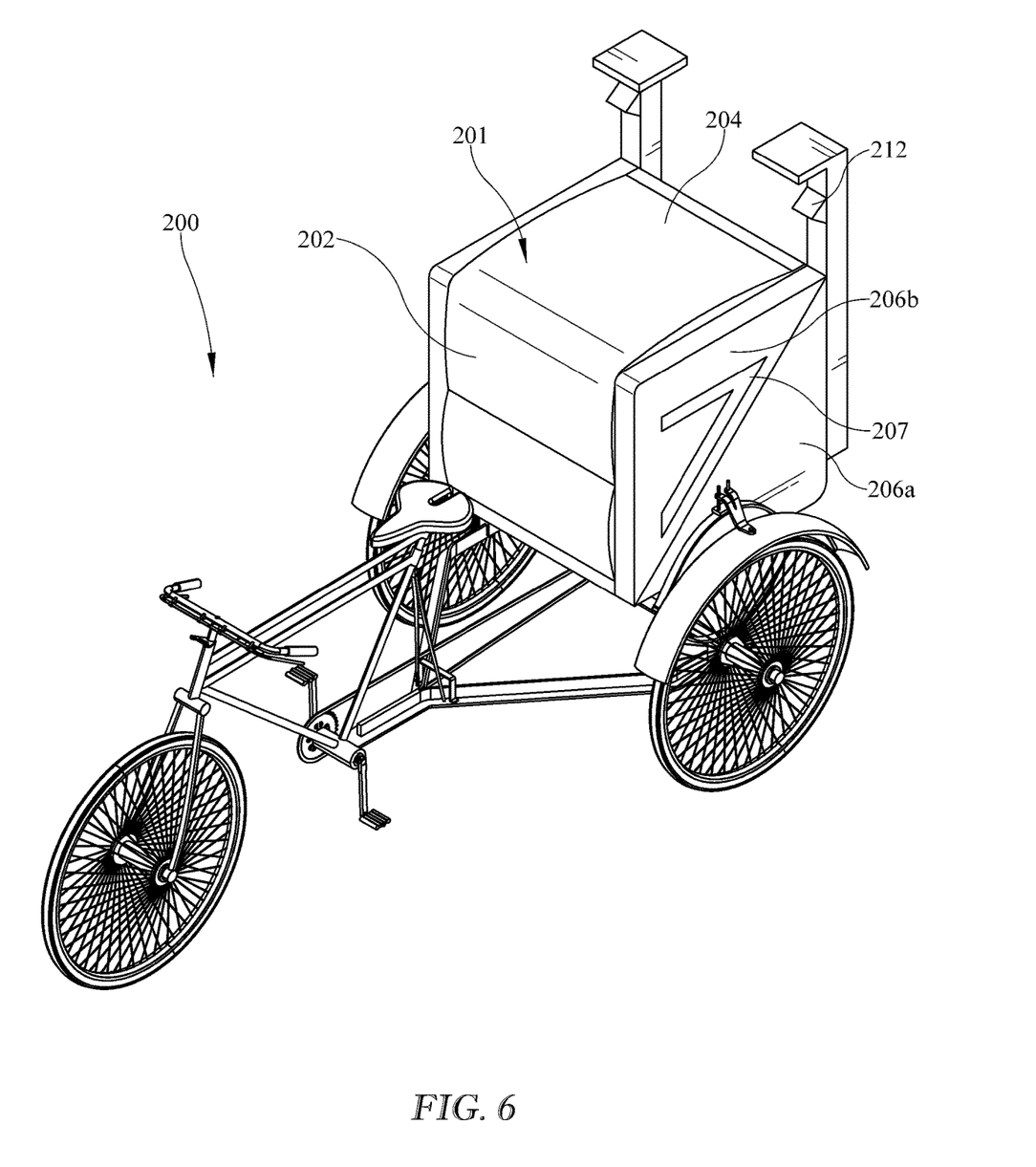
FIG. 6 is perspective view of the transformable bicycle or tricycle of the present disclosure having a transformable seat transformed into a carrier.
Figure 7:
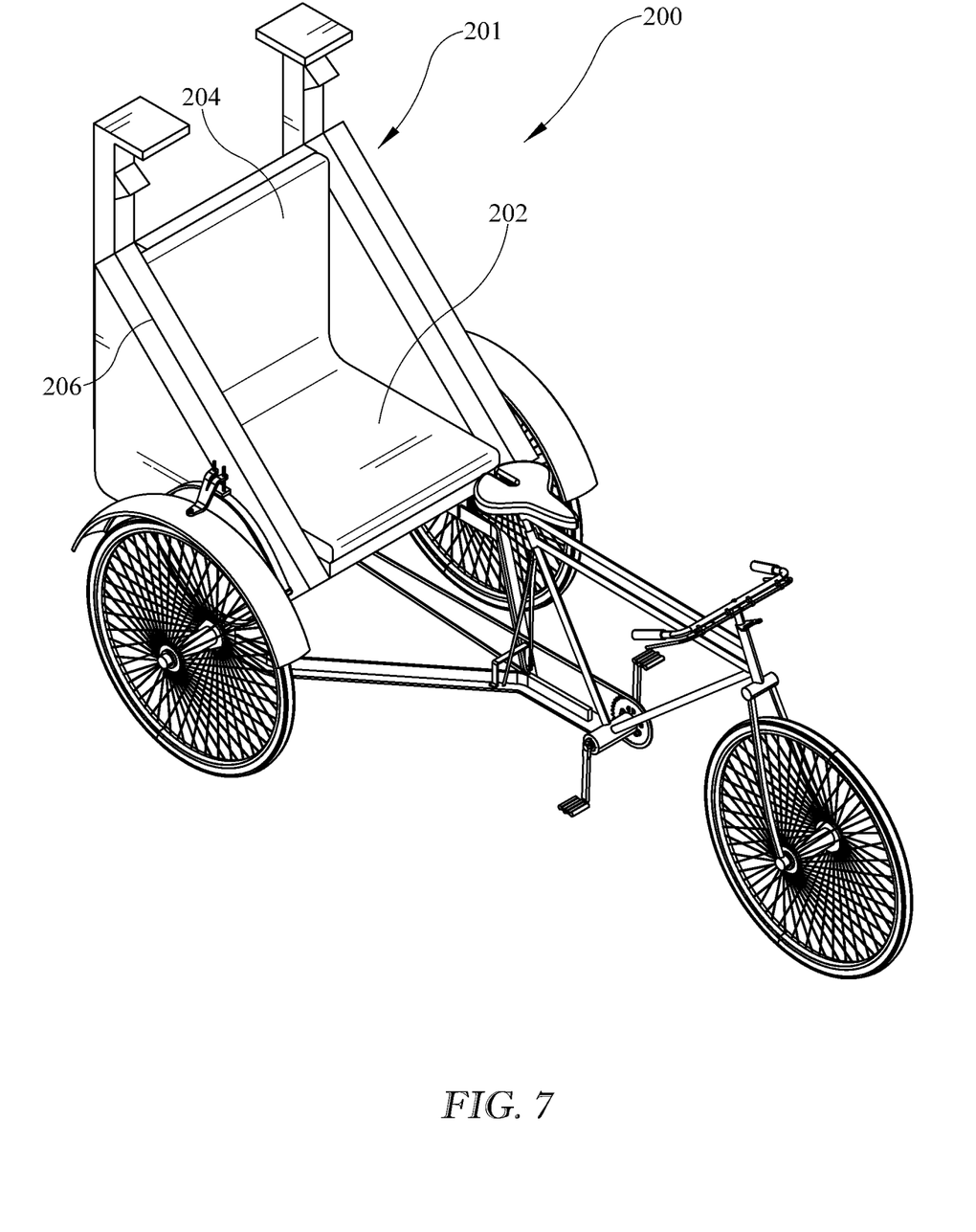
FIG. 7 is a perspective view of the transformable bicycle or tricycle of FIG. 6 having the transformable seat transformed into a seat.
Figure 8:
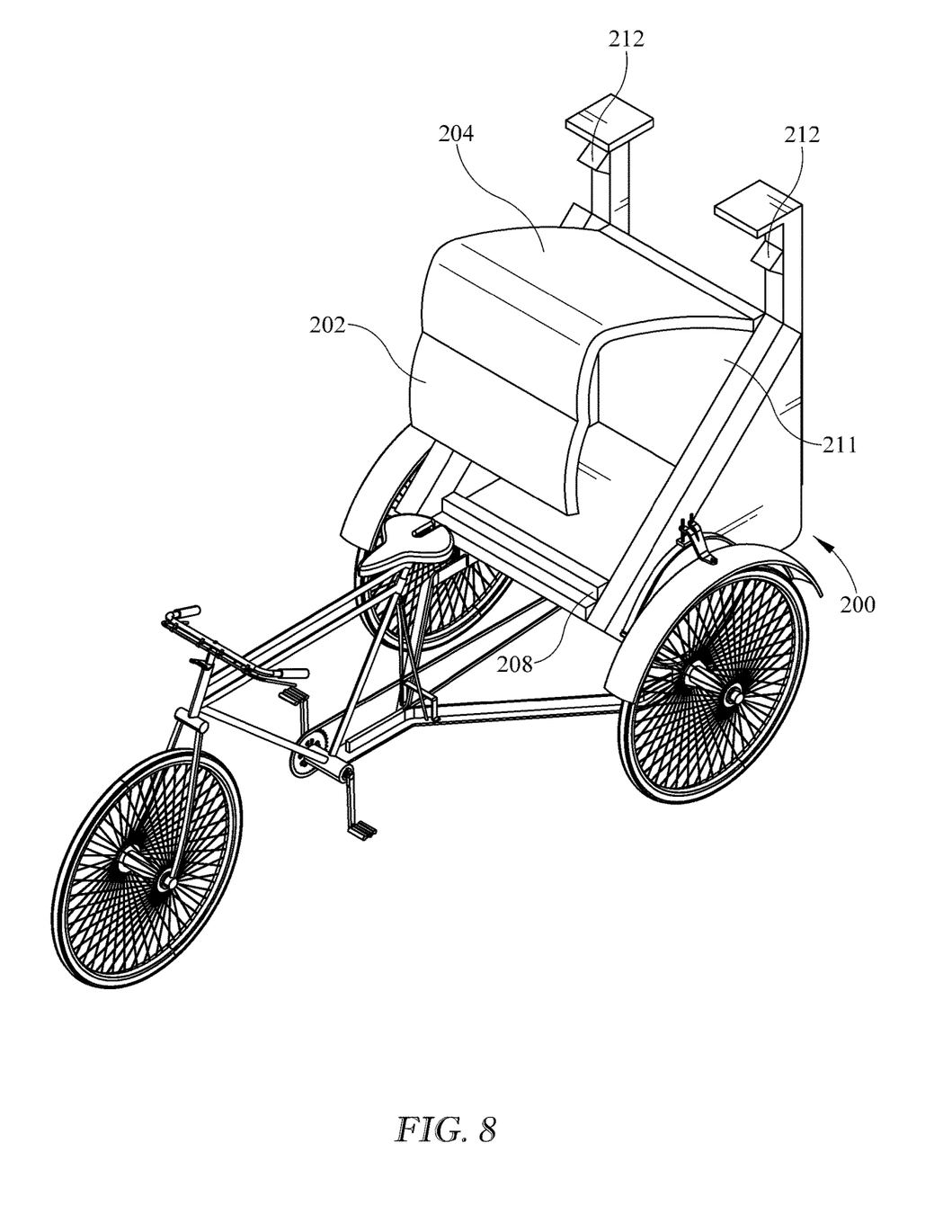
FIG. 8 is a perspective view of the transformable bicycle or tricycle of FIG. 6 being transformed and the transformable seat having a sidewall with an opening.

In at least one embodiment of the present disclosure, a transformable bicycle or tricycle has a seat that is transformable between a seat and a carrier. Transformable bicycle or tricycle 200 may have a transformable seat 201. FIG. 6 shows a perspective view of transformable bicycle or tricycle 200 having transformable seat 201 transferred into a carrier and FIG. 7 shows transformable seat 201 transformed into a seat. FIG. 8 shows transformable bicycle or tricycle 200 having seat 201 being transformed and a sidewall having an opening.

Transformable seat 201 may have may have a bottom 208 adapted to be held with the frame or a support extending from the frame. A rear wall 211 may be adapted to extend upward from proximate a rear edge of bottom 208. Transformable seat 201 may have a first sidewall 206 and a second sidewall 207, each of the sidewalls may be adapted to extend upward from proximate a side edge of bottom 208.

At least one of first sidewall 206 and second sidewall 207 may be configured to have an opening. For example, first sidewall 206 and/or second sidewall 207 may have two side portions, 206a and 206b, hingedly attached to each other. In a first configuration of the hingedly attached side portions, 206a and 206b, provides a substantially closed side sidewall of Transformable seat 201 as shown in FIG. 6. A second configuration of the hingedly attached side portions, 206a and 206b, provides a side having an opening as shown in FIGS. 7 and 8.

The presently disclosed transformable seat 201 may have two planar portions, 202 and 204, hingedly attached to each other and having an end hingedly attached proximate an upper edge of the rear wall 211. A first configuration of the hingedly attached planar portions, 202 and 204, provides a substantially closed top and a front wall of transformable seat 201 as shown in FIG. 6. A second configuration of the hingedly attached planar portions, 202 and 204, provides a seat between first sidewall 206 and second sidewall 207, as shown in FIG. 7.

Side portions 206a and 206b may be triangular and may be configured to provide a side having a triangular opening as shown in FIGS. 7 and 8. First sidewall 206 and second sidewall 207 may both have the two side portions, 206a and 206b, hingedly attached to each other. One or more lights 212 may be supported with transformable seat 201, as shown in FIG. 6. In at least one embodiment of the presently disclosed transformable bicycle, the walls of the carrier are insulated which may be advantageous in maintaining a temperature of items being carried in the carrier.

Presently disclosed is a method of transforming a transformable seat from a seat to a carrier and from a carrier to a seat. The transformable seat is adapted to be held or towed, in the form of a trailer, by a bicycle or tricycle. A vertical seat back is lifted from a vertical orientation and placed into a horizontal orientation to provide a top wall, or roof, of a carrier. A seat cushion is lifted from a horizontal orientation and placed into a vertical orientation to provide a front wall of the carrier. This may be performed by hingedly rotating the seat back about a back wall and hingedly rotating the seat cushion about the seat back. The method may also comprise transforming one or both sides to an opening.

Upon the transformable seat 201 being transformed into a seat, it may be transformed back into the carrier by moving the horizontally orientated top wall, or roof, of the carrier into a vertical orientation to provide a seat back. The front wall of the carrier may be moved from a vertical orientation to a horizontal orientation to provide a seat cushion.

Upon reading the present disclosure, it will become apparent to one skilled in the art that other and different structures of the transformable bicycle or tricycle may become known. For example, the front wall and top wall of the carrier may be comprised of a variety of materials such as rigid, semi-rigid, or non-rigid materials. For example, a subtle material such as sheet of cloth or polymeric material may be provided for the transformation of the transformable seat from a seat to a carrier and back to the carrier.

The invention claimed is:

1. A transformable bicycle or tricycle comprising:
   a steerable front wheel;
   at least one rear wheel;
   a frame operable holding the steerable front wheel and the at least one rear wheel;
   at least two pedals configured and disposed to rotate the at least one rear wheel and move the bicycle or tricycle, upon rotating the pedals;
   a first seat;
   a second seat disposed rearward or forward of the first seat and comprising a planar seat and a planar back and configured to transform into an enclosure;
   the planar back is configured and disposed to extend upwardly from a rear edge of the planar seat;
   at least one sidewall configured and disposed to extend from a side edge of the planar seat to a side edge of the planar back; and
   the sidewall has a first planar portion and a second planar portion, the first and second planar portions of the sidewall each having an edge rotatingly or hingedly held together, the sidewall being configured and disposed to provide an opening in the sidewall, upon rotating the first or second planar portion of the sidewall.

2. The transformable bicycle or tricycle of claim 1, wherein the frame is extendable and retractable and the transformable second seat is configured to move rearward and forward of the first seat, upon the planar seat and the planar back being disposed in substantially the same plane.

3. The transformable bicycle or tricycle of claim 1, wherein the transformable second seat has a top planar portion and a front planar portion, the top planar portion having a first edge rotatingly held to an upper edge of the planar back and a second edge rotatingly held to an edge of the front planar portion, the top and front planar portions being configured and disposed to form a top and a front of the enclosure.

4. A transformable tricycle comprising:
   a steerable front wheel;
   two rear wheels;
   an extendable and retractable frame having at least one extendable and retractable frame bar and extending between an axle supporting the rear wheels and a fork holding the steerable front wheel;
   at least two pedals configured and disposed to rotate at least one of the rear wheels and move the tricycle, upon rotating the pedals;
   a first transformable seat;
   a second seat configured to be disposed rearward or forward of the first seat;
   the first transformable seat comprising a planar seat rotatingly or hingedly held to an edge of a planar back;
   the first seat being configured and disposed to transform into the flat planar bench having the planar seat and the planar back disposed substantially in the same plane;
   the first seat is configured to move rearward and forward of the second seat, upon the first seat having its planar seat and planar back disposed in substantially the same plane; and
   a hand or motor driven crank configured and disposed to extend and retract the at least one frame bar, upon moving the hand or motor driven crank.

5. The transformable tricycle of claim 4 having a longitudinally extending screw configured and disposed to threadingly cooperate with the at least one frame bar and to extend and retract the at least one frame bar, upon moving the hand or motor driven crank.

6. The transformable tricycle of claim 5 having the at least one frame bar extending from a threaded plate, the longitudinally extending screw being configured and disposed to threadingly cooperate with the threaded plate and to extend and retract the at least two frame bars, upon moving the hand or motor driven crank.

7. The transformable tricycle of claim 4 having a pair of extendable pedal bars, each of the pedal bars being configured and disposed to extend and retract upon extending and retracting the frame and to cooperate with one of the at least two pedals and rotate the at least one rear wheel, upon the rotating of the pedals.

8. The transformable tricycle of claim 7 having at least two pedals in cooperation with each of the extendable pedal bars, wherein a length of the extendable pedal bar between the two pedals is configured to lengthen and shorten, upon the extending and the retracting of the frame.

9. The transformable tricycle of claim 4, wherein the second seat is transformable and has a planar seat with an edge rotatingly or hingedly held to an edge of a planar back, the second seat being configured and disposed to transform from an enclosure and into the flat planar bench having its planar seat and its planar back disposed substantially in the same plane.

10. The transformable tricycle of claim 9, wherein the second seat has at least one planar seat extending portion with an edge rotatingly or hingedly held to an edge of the planar seat and at least one planar back extending portion with an edge rotatingly or hingedly held to an edge of the planar back.

11. A transformable bicycle or tricycle comprising:
    a steerable front wheel;
    at least one rear wheel;
    a frame extending between a rear axle supporting the at least one rear wheel and a fork holding the steerable front wheel;
    at least two pedals configured and disposed to rotate the at least one rear wheel and move the bicycle or tricycle, upon rotating the pedals;
    a first seat;
    a second seat disposed rearward or forward of the first seat having a planar seat, a planar back, a top planar portion having a first edge rotatingly or hingedly held to an upper edge of the planar back, and a front planar portion rotatingly or hingedly held to a second edge of the top planar portion; and
    the second seat being configured and disposed to transform into an enclosure.

12. The transformable bicycle or tricycle of claim 11, wherein the second seat has at least one sidewall extending from a side edge of the planar seat to a side edge of the planar back.

13. The transformable bicycle or tricycle of claim 12, wherein the sidewall has a first planar portion and a second planar portion, the first and second planar portions of the sidewall each having an edge rotatingly or hingedly held together, the sidewall being configured and disposed to provide an opening in the sidewall, upon rotating the first or second planar portion of the sidewall.

14. The transformable bicycle or tricycle of claim 7 having a pair of paddle bars, each of the paddle bars are in communication with one of the pedal bars and configured and disposed to enable a rider to power the transformable bicycle or tricycle by hand.

\* \* \* \* \*